(12) United States Patent
Endo et al.

(10) Patent No.: US 8,524,033 B2
(45) Date of Patent: Sep. 3, 2013

(54) COATED WOOD COMPOSITE AND PRODUCTION METHOD THEREOF

(75) Inventors: Takayuki Endo, Shizuoka (JP); Hideki Tsuboi, Shizuoka (JP); Kiichiro Tominaga, Osaka (JP)

(73) Assignee: Yamaha Fine Technologies Co., Ltd., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/966,815

(22) Filed: Dec. 13, 2010

(65) Prior Publication Data

US 2011/0079353 A1   Apr. 7, 2011

Related U.S. Application Data

(62) Division of application No. 11/461,983, filed on Aug. 2, 2006, now Pat. No. 7,867,622.

(30) Foreign Application Priority Data

Aug. 3, 2005   (JP) .................................. 2005-225144

(51) Int. Cl.
*B32B 27/36* (2006.01)
(52) U.S. Cl.
USPC .................................... 156/331.7; 428/537.1
(58) Field of Classification Search
USPC .................................... 156/331.7; 428/537.1
See application file for complete search history.

(56) References Cited

U.S. PATENT DOCUMENTS

| | | | | |
|---|---|---|---|---|
| 3,288,735 A | * | 11/1966 | Watanabe et al. | 264/121 |
| 3,658,622 A | * | 4/1972 | Horowitz et al. | 156/331.9 |
| 5,314,729 A | * | 5/1994 | Ikezoe et al. | 428/15 |
| 5,405,705 A | * | 4/1995 | Fujimoto et al. | 428/537.1 |
| 6,852,399 B2 | | 2/2005 | Takahashi et al. | |
| 2002/0182429 A1 | * | 12/2002 | Yokochi et al. | 428/537.5 |
| 2003/0134108 A1 | * | 7/2003 | Lakatosh et al. | 428/343 |

FOREIGN PATENT DOCUMENTS

| | | |
|---|---|---|
| JP | 7-285207 | 10/1995 |
| JP | 2630462 | 4/1997 |
| JP | 2645748 | 5/1997 |
| JP | 10-219089 | 8/1998 |
| JP | 2002-128843 | 5/2002 |
| JP | 2002-167448 | 6/2002 |
| JP | 2003-159724 | 6/2003 |
| JP | 2004-346151 | 12/2004 |

* cited by examiner

*Primary Examiner* — Michael Orlando
*Assistant Examiner* — Daniel Lee
(74) *Attorney, Agent, or Firm* — Dickstein Shapiro LLP

(57) ABSTRACT

To provide: a coated wood composite having surface properties such as transparency, smoothness, gloss, uniformity, and depth, and excellent in various physical properties such as durability and strength; and a method for producing such a coated wood composite efficiently and easily. A coated wood composite produced by placing an unsaturated polyester resin composition on a decorative veneer and heat-pressing the decorative veneer and the composition placed thereon to mold the composite, wherein the unsaturated polyester resin composition comprises: an unsaturated polyester; a polymerizable monomer; and an isocyanate component essentially including an aliphatic diisocyanate.

5 Claims, No Drawings

COATED WOOD COMPOSITE AND PRODUCTION METHOD THEREOF

CROSS REFERENCE TO RELATED APPLICATIONS

This application is a divisional of co-pending U.S. application Ser. No. 11/461,983, filed Aug. 2, 2006, the entire contents of which are incorporated herein by reference.

TECHNICAL FIELD

The present invention relates to a coated wood composite and a production method thereof. More specifically, the present invention relates to a coated wood composite widely used for higher ornamental use in furniture, a musical instrument, an interior part of a car and the like, and a production method thereof.

BACKGROUND ART

Composites (composite materials) with a transparent resin layer coated on the surface of decorative veneers are widely used for higher ornamental use in furniture, a musical instrument, an interior part of a car and the like. As a method for providing resin coating for such composites, generally adopted is a method comprising: (1) first, as a preparation before coating, sanding a decorative veneer for surface-smoothing and dirt removal; performing multi-times primer coating and subsequent drying for prevention of grain depression and tar, as well as for uniformization in appearance color tone; and sanding the decorative veneer again, (2) performing middle coat and finishing coat for thickness retention, depth, and transparency of the decorative veneer, and for prevention of grain depression and then drying; and (3) finally, sanding the decorative veneer again and performing polish finishing with a compound wax. The coating is generally performed by spray coating. However, use of such a conventional spray coating method has been insufficient in coating efficiency of coating materials. Therefore, such a method has a room for improvement to provide a uniform and smooth coating film efficiently, and to simplify working processes for more improved productivity. Environmental pollution caused by spray dust of coating materials or volatilization of organic solvents is also concerned, and therefore there is room for improvement in that point. Furthermore, natural precious woods are used as such decorative veneers. Therefore, air and moisture are easily gathered at fine gap parts or uneven parts, such as splits behind the decorative veneer caused in slicing or woody fiber conductors. As a result, white turbidity spots may be generated at the time of drying of coating films, or minute unevenness, cracks, separation and the like may be generated under environmental condition with remarkable change in temperature and humidity. Therefore, there is room for improvement in order to exhibit high appearance by eliminating such defects.

Thus, composites produced by alternative methods in lieu of the spray coating methods are disclosed, such as: a decorative veneer-plastic composite plate comprising a base plate, a decorated veneer covered thereon, and a transparent resin-coated layer (for example, referring to Japanese Patent No. 2630462 (pages 1 and 2)); and a decorative veneer-plastic composite material comprising a base material, a decorative veneer covered thereon, and a transparent resin surface coat layer (for example, referring to Japanese Patent No. 2645748 (pages 1 and 2)). In such a composite plate of a composite material, used is a method, in which the above-mentioned components are cured and formed integrally by heat-pressing. However, there is room for improvement to simplify such working steps, as well as to efficiently and easily produce a composite with excellent appearance and with more excellent coating film properties, such as weathering resistance and strength.

As methods for producing a decorative laminate comprising a paper sheet, not a decorative veneer, disclosed is a method for manufacturing a resinous decorative laminate, wherein an agar-like transparent or semi-transparent thermosetting resin composition is placed on the surface of either a thermosetting resin impregnated paper placed on a base material or a printed paper stuck to the base material, and a press molding is performed by bringing a mirror face of a mirror face plate into contact with the surface (for example, referring to Japanese Kokai Publication Hei-7-285207 (page 2)). However, a decorative veneer and a paper sheet widely differ in characteristics, performance, application and the like. Therefore, a composite produced by using a decorative veneer has a room for improvement in performance of a resin coating film and production efficiency of the composite.

SUMMARY OF THE INVENTION

The present invention has been made in view of the above-mentioned state of the art. The present invention has an object to provide: a coated wood composite having surface properties such as transparency, smoothness, gloss, uniformity, and depth, and excellent in various physical properties such as durability and strength; and a method for producing such a coated wood composite efficiently and easily.

The present inventors have made various investigations about coated wood composites. And they have first noted that resin compositions containing an unsaturated polyester and a polymerizable monomer are useful for coating woody materials in terms of transparency and strength. They have found that if such resin compositions further contain an isocyanate component essentially containing an aliphatic diisocyanate as a thickener, coating films having excellent appearance and sufficient thickness can be obtained. Metal oxides such as magnesium oxide and calcium oxide are common as the thickener. However, use of such metal oxides may cause a phase separation of the resin composition, or may need a long time for providing thickening to the resin composition, or may generate white turbidity. However, use of such an isocyanate component essentially containing an aliphatic diisocyanate improves the above-mentioned problems. Therefore, production efficiency of the coated wood composite can be improved and the coated wood composite excellent in surface characteristics and capable of exhibiting excellent properties particularly in impact resistance and resistance to scratch can be produced. They have found that if such an unsaturated polyester resin composition is placed on a decorative veneer and then the decorative veneer and the composition placed applied thereon are heat-pressed for molding, they can obtain the coated wood composite exhibiting good appearance, and being high-gloss and excellent in physical properties such as durability and strength, even without any complicated works such as surface polishing in particular. They have also found that such a method makes working environment at the time of production of the coated wood composite excellent. Thereby, the above-mentioned problems have been admirably solved, leading to completion of the present invention.

That is, the present invention provides to a coated wood composite produced by placing an unsaturated polyester resin composition on a decorative veneer and heat-pressing the decorative veneer and the composition placed thereon to mold the composite, wherein the unsaturated polyester resin composition comprises: an unsaturated polyester; a polymerizable monomer; and an isocyanate component essentially including an aliphatic diisocyanate, and a ratio of a hydroxyl group equivalent in the unsaturated polyester to an isocyanate group equivalent in the isocyanate component is 1:0.7 to 1.2, and the unsaturated polyester includes 50% by mole or more of unsaturated dibasic acid component relative to 100% by mole of whole acid components, and a weight ratio of the acid component to glycol component and/or epoxy compound component in the unsaturated polyester is 1:1.3 to 2.0.

The present invention also provides a production method of a coated wood composite produced by placing an unsaturated polyester resin composition on a decorative veneer and heat-pressing the decorative veneer and the composition placed thereon to mold the composite, wherein the unsaturated polyester resin composition comprises: an unsaturated polyester; a polymerizable monomer; and an isocyanate component essentially including an aliphatic diisocyanate, and the production method comprises the steps of: curing the unsaturated polyester resin composition under conditions where a temperature of a mold is 80 to 160° C. and a pressure is 5 to 100 kg/cm$^2$; lowering the temperature of the mold by 30° C. or more while maintaining the pressure; and removing a produced coated wood composite from the mold (hereinafter, referred to also as "production method (1)").

The present invention further provides a production method of a coated wood composite produced by placing an unsaturated polyester resin composition on a decorative veneer and heat-pressing the decorative veneer and the composition placed thereon to mold the composite, wherein the unsaturated polyester resin composition comprises: an unsaturated polyester, a polymerizable monomer, and an isocyanate component essentially including an aliphatic diisocyanate, and the production method comprises the steps of: preliminarily pressing the unsaturated polyester resin composition to a mold under conditions where a temperature of the mold is less than 80° C. and a pressure is 5 to 100 kg/cm$^2$; curing the unsaturated polyester resin composition by raising the temperature of the mold by 20° C. or more to 80 to 160° C. while maintaining the pressure; and removing a produced coated wood composite from the mold (hereinafter referred to also as "production method (2)").

And the present invention provides a production method of a coated wood composite produced by placing an unsaturated polyester resin composition on a decorative veneer and heat-pressing the decorative veneer and the composition placed thereon to mold the composite, wherein the unsaturated polyester resin composition comprises: an unsaturated polyester, a polymerizable monomer, and an isocyanate component essentially including an aliphatic diisocyanate, and the production method comprises the steps of: preliminarily pressing the unsaturated polyester resin composition to a mold under conditions where a temperature of the mold is less than 80° C. and a pressure is 5 to 100 kg/cm$^2$; curing the unsaturated polyester resin composition by raising the temperature of the mold by 20° C. or more to 80 to 160° C. while maintaining the pressure; lowering the temperature of the mold by 30° C. or more while maintaining the pressure; and removing a produced coated wood composite from the mold (referred to also as "production method (3)").

DETAILED DESCRIPTION OF THE INVENTION

The present invention will, hereinafter, be described in more detail.

The coated wood composite of the present invention and a coated wood composite produced by the production methods (1) to (3) of the present invention are produced by placing an unsaturated polyester resin composition on a decorative veneer and heat-pressing the decorative veneer and the composition placed thereon to mold the composite. Thus, "a coated wood composite" means "a composite produces by coating wood with unsaturated polyester resin composition". The phrase "heat-pressing the decorative veneer and the composition placed thereon to mold the composite" means molding the composite by a compression molding method or an injection molding method in this invention. Such coated wood-composites contain at least a layer of a decorative veneer and a resin layer of an unsaturated polyester resin component. For example, the coated wood composites may further contain a layer of a substrate below the layer of a decorative veneer.

The above-mentioned coated wood composites can be used in various fields such as film products, molded plastic articles including sheet, household electrical appliances, steel works, large-sized structures, cars, vessels, constructions, building materials, display materials, machines, instruments, industrial machine, glasswares, various industrial products, furnishings, and musical instruments. Among them, the coated wood composites are most preferably used in interior parts of cars. Such a coated wood composite for interior parts of cars is also part of preferable embodiment of the present invention.

The above-mentioned substrate may be appropriately determined depending on applications and the like, and is not especially limited. Examples of such a substrate include substrates made of inorganic materials such as glass, slate, concrete, mortar, ceramic, and stone; substrates made of metallic base materials, such as: metallic plates made of aluminum, iron, zinc, tin, copper, titanium, stainless steel, tin, galvanized iron and the like; metallic plates having a surface coated with zinc, copper, chromium and the like; and metallic plates having a surface treated with chromic acid, phosphoric acid, and the like; substrates made of plastic materials such as polyethylene, polyvinyl chloride, ABS (acrylonitrile-butadiene-styrene), FRP (fiber-reinforced plastic), polyethylene terephthalate, polycarbonate, polymethylmethacrylate, polystyrene, polypropylene, polyester, polyolefin, acrylate resin, epoxy resin, and nylon resin; synthetic leathers; substrates made of woody materials such as Japan cypress, Japan cedar, pine, and plywood; and substrates made of organic materials, such as fiber and paper.

If a decorative veneer is placed on such substrates, an adhesive agent may or may not be used. Preferable adhesive agent is an adhesive agent mainly including an unsaturated polyester resin or a urethane resin, for example. An elastomer adhesive agent is also preferred.

The decorative veneer may be placed on the substrate also by an insert molding method, in addition to the above-mentioned placing method using the adhesive agent. Specifically, a decorative veneer is placed on a plastic substrate by an insert molding method, in which the decorative veneer is placed inside a mold for injection molding, and the above-mentioned synthetic resin such as ABS is injected.

The above-mentioned decorative veneer is not especially limited. As the decorative veneer, mentioned may be thin plates of a flat or straight grain and figured grain of a natural precious wood, such as teak, rosewood, walnut, camphor tree, and birdseye maple. The decorative veneer may be provided with toning treatment by dyeing, coating and the like, and also may be coated with a primer usually used or a coating material for coating such as for first coating, middle coating, and finishing coating such as metallic base. Furthermore, the decorative veneer may have a reinforcement backer such as metal sheet, paper, nonwoven fabric, fabric, resin sheet, and veneer. Use of such reinforcement backers can prevent a crack in the decorative veneer at the time of molding by heat-pressing and enables a composite with higher quality to be produced. An elastomer adhesive agent is preferable as an adhesive agent to join reinforcement backers to the decorative veneer.

Thickness of the above-mentioned layer formed by the decorative veneer is not especially limited, and may be appropriately determined depending on applications and the like. For example, the thickness is preferably 0.1 to 2.0 mm. If it is less than 0.1 mm, the layer might have insufficient strength. If it is more than 2.0 mm, the layer might have insufficient shape following property. The thickness is more preferably 0.15 to 0.8 mm, and still more preferably 0.2 to 0.5 mm.

The above-mentioned unsaturated polyester resin composition comprises an unsaturated polyester resin and an isocyanate component essentially including an aliphatic diisocyanate. The term "unsaturated polyester resin" includes both the unsaturated polyester and the polymerization monomer.

In the above-mentioned unsaturated polyester resin, the unsaturated polyester is prepared by a condensation reaction of polybasic acid components (acid components) with glycol component and/or epoxy compound component. The weight ratio (the acid component:the glycol component and/or the epoxy compound component) is preferably 1:1.3 to 2.0. If a total weight of the glycol component and/or the epoxy compound component is less than 1.3 weights relative to 1 weight of the acid component, weight of the diisocyanate to be added is small. Therefore, a sufficiently thickened substance might not be produced, and impact resistance of a cured product might be reduced. If a total weight of the glycol component and/or the epoxy compound component is more than 2.0 weights relative to 1 weight of the acid component, excess glycol component may show an adverse effect on physical properties of a cured product, and a thickened substance might not be spread uniformly as a coating film at the time of the heat-pressing because the thickened substance is thickened too much. The weight ratio is more preferably 1:1.5 to 2.0, and still more preferably 1:1.7 to 2.0.

In the above-mentioned unsaturated polyester, the acid component may be a compound containing two or more substituent groups capable of forming an ester bond by reacting with a hydroxyl group and/or an epoxy group each contained in the glycol component and/or the epoxy compound component. And saturated polybasic acid may be used in lieu of part of essential unsaturated polybasic acid component.

Examples of the above-mentioned unsaturated polybasic acid include one or more kinds of α-β unsaturated polybasic acids such as maleic acid, fumaric acid, aconitic acid, and itaconic acid; β-γ unsaturated polybasic acids such as dihydromuconic acid; anhydrides of these acids; halides of these acids; and alkyl esters of these acids.

It is preferable that the above-mentioned unsaturated polyester contains 50% by mole or more of unsaturated dibasic acids relative to 100% by mole of a total amount of the acid component. If the unsaturated polyester contains less than 50% by mole of unsaturated dibasic acids, insufficient strength in high temperature might cause cracks at the time of the heat-pressing and separation of the coating film from the decorative veneer at the time of removal from the mold, and physical properties such as chemical resistance and toughness for a cured product might be insufficient. The unsaturated polyester more preferably contains 60% by mole or more of the unsaturated dibasic acids, and still more preferably 70% by mole or more of the unsaturated dibasic acids.

Examples of the above-mentioned saturated polybasic acid include one or more kinds of: aliphatic saturated polybasic acids such as malonic acid, succinic acid, methyl succinic acid, 2,2-dimethyl succinic acid, 2,3-dimethyl succinic acid, hexyl succinic acid, glutaric acid, 2-methyl glutaric acid, 3-methyl glutaric acid, 2,2-dimethyl glutaric acid, 3,3-dimethyl glutaric acid, 3,3-diethyl glutaric acid, adipic acid, pimelic acid, suberic acid, azelaic acid, and sebacic acid; aromatic saturated polybasic acids, such as phthalic acid, isophthalic acid, terephthalic acid, trimellitic acid, and pyromellitic acid; and alicyclic saturated polybasic acids, such as HET acid, 1,2-hexahydrophthalic acid, 1,1-cyclobutane dicarboxylic acid, trans-1,4-cyclohexane dicarboxylic acid, and dimer acid; anhydrides of these acids; halides of these acids; and alkyl esters of these acids.

Examples of the above-mentioned glycol component include one or more kinds of: ethylene glycol, diethylene glycol, 1,3-propanediol, 2-methyl-1,3-propanediol, 1,4-butanediol, 1,3-butanediol, 2,3-butanediol, dipropylene glycol, 1,5-pentanediol, 1,6-hexanediol, 2,2-dimethyl-1,3-propanediol (neopentyl glycol), 2-ethyl-1,4-butanediol, 1,7-heptanediol, 1,8-octanediol, 1,9-nonanediol, 1,10-decanediol, 1,4-cyclohexanediol, 1,4-dimethylolcyclohexane, 2,2-diethylpropane-1,3-diol, 3-methylpentane-1,4-diol, 2,2-diethyl butane-1,3-diol, 4,5-nonane diol, triethylene glycol, bisphenol A hydride, alkylene oxide adduct of bisphenol A, alkylene oxide adduct of bisphenol A hydride, glycerin, trimethylol propane, pentaerythritol, and dipentaerythritol.

Examples of the above-mentioned epoxy compound component include one or more kinds of ethylene oxide, propylene oxide, butylene oxide, styrene oxide, 3,4-epoxy-1-butene, glycidyl acrylate, glycidyl methacrylate, and bisphenol A diglycidyl ether.

Part of the above-mentioned raw materials of the unsaturated polyester may be replaced with a compound having an unsaturated bond mentioned below, such as allyl group, to produce the unsaturated polyester. In this case, the unsaturated polyester can be what is called air-cured polyester. Specifically, at least a total amount or part of the above-mentioned polybasic acid component may be replaced with an unsaturated polybasic acid having an unsaturated bond mentioned below, such as allyl group, or a total amount or part of the above-mentioned glycol component and/or the epoxy compound component may be replaced with a glycol component and/or an epoxy compound component having an unsaturated bond mentioned below, such as allyl group.

Examples of the above-mentioned unsaturated polybasic acid component having an unsaturated bond include one or more kinds of tetrahydrophthalic anhydride, α-terpinene-maleic anhydride adduct, dicyclopentadiene-maleic anhydride adduct (endomethylene tetrahydrophthalic acid), rosin, rosin ester, drying oil fatty acid, semi-drying oil, and fatty acid.

Examples of the above-mentioned glycol component and/or the epoxy component having an unsaturated bond include one or more kinds of trimethylolpropane monoallyl ether, trimethylolpropane diallyl ether, trimethylolethane monoallyl ether, trimethylolethane diallyl ether, pentaerythritol monoallyl ether, pentaerythritol diallyl ether, pentaerythritol triallyl ether, glycerin monoallyl ether, glycerin diallyl ether, and allyl glycidyl ether.

In the above-mentioned unsaturated polyester resin, examples of the polymerizable monomer include styrene, vinyltoluene, paramethylstyrene, chlorostyrene, divinylbenzene, vinyl acetate; monofunctional alkyl(meth)acrylate such as methyl(meth)acrylate, ethyl(meth)acrylate, butyl(meth)acrylate, and hexyl(meth)acrylate; monofunctional (meth)acrylate having a cyclic structure in the molecule such as cyclohexyl methacrylate, tetrahydrofurfuryl methacrylate, benzyl methacrylate, isobornyl methacrylate, dicyclopentenyloxyethyl methacrylate, and phenoxyethyl methacrylate; and polyfunctional (meth)acrylate such as (poly)ethylene glycol di(meth)acrylate, neopentyl glycol dimethacrylate, (poly)propylene glycol di(meth)acrylate, bisphenol A alkylene oxide di(meth)acrylate, and trimethylolpropane tri(meth)acrylate. These may be used singly or in combination of two or more kinds. Among them, styrene is preferably used.

With respect to weight ratio of the unsaturated polyester and the polymerizable monomer in the above-mentioned unsaturated polyester resin, the unsaturated polyester is 80 to 40% by weight, and the polymerizable monomer is 20 to 60% by weight, relative to 100% by weight of the unsaturated polyester resin. If the unsaturated polyester is less than 40% by weight, a sufficiently thickened substance is hard to produce, and a cured product might be insufficient in physical properties such as chemical resistance and toughness. If the unsaturated polyester is more than 80% by weight, the unsaturated polyester resin is hard to mix with a thickener, and a uniform thickened substance might not be produced. As preferred ranges of the weight ratio, the unsaturated polyester is 80 to 50% by weight, and the polymerizable monomer is 20 to 50% by weight.

In the above-mentioned unsaturated polyester resin composition, the isocyanate component may contain the other isocyanate different from the aliphatic diisocyanate as long as it essentially contains the aliphatic diisocyanate. If the unsaturated polyester resin composition essentially includes the aliphatic diisocyanate, the unsaturated polyester resin is suitable for the heat-pressing step because the resin is sufficiently thickened, but not becomes too hard.

Content ratio of the above-mentioned aliphatic diisocyanate is 50% by weight or more, relative to 100% by weight of a total amount of the isocyanate component, whereby to sufficiently exhibit above-mentioned effects of the aliphatic diisocyanate. The content ratio of the aliphatic diisocyanate is more preferably 80% by weight or more.

Examples of the aliphatic diisocyanate include one or more kinds of IPDI (isophorone diisocyanate), H12MDI (dicyclohexylmethane diisocyanate), H6XDI (1,3-bis-(isocyanato methyl)-cyclohexane), CHDI (cyclohexane diisocyanate), HDI (hexamethylene diisocyanate), DDI (dimer acid diisocyanate), and NBDI (norbornene diisocyanate).

The other isocyanate the above-mentioned isocyanate component may contain is not especially limited, and mentioned may be MDI (methylene diphenyl diisocyanate), TDI (tolylene diisocyanate), XDI (xylylene diisocyanate), NDI (naphthylene 1,5-diisocyanate), and TMXDI (tetramethylene xylylene diisocyanate). In addition, mentioned may be an adduct of the above-mentioned isocyanate and a polyol; a trimer compound having diisocyanate and a biuret or isocyanurate ring structure; or a polymer compound. These may be used singly or in combination of two or more kinds. However, it is preferable that such an aromatic ring isocyanate is 10% by weight or less, relative to a total amount of the isocyanate, because obtained resin may get colored in the presence of such an aromatic ring isocyanate.

Content ratio of the isocyanate component is preferably determined such that a ratio of a hydroxyl group equivalent in the unsaturated polyester to an isocyanate group equivalent in the isocyanate component is 1:0.7 to 1.2. If the isocyanate group equivalent is less than 0.7 per the hydroxyl group equivalent, thickening property might be insufficient. If the isocyanate group equivalent is more than 1.2, a uniform thickened substance might not be produced, and in addition, a residual isocyanate group may harm an operator by in handling the thickened product. The content ratio is more preferably 1:0.8 to 1.0, and still more preferably 1:0.8 to 0.95.

The above-mentioned unsaturated polyester resin composition may contain a curing agent, and if necessary, an additive agent (additive material) such as a supplement accelerator, an agent for providing air-dry property, a filler, a polymerization inhibitor, an antifoaming agent, an internal release agent, a thickener other than the above-mentioned isocyanate component, a thickening aid, an inorganic aggregate, a shrinkage-reducing agent, a coloring agent, a designing agent, inert powders, an ultraviolet absorber, an antioxidant, a plasticizer, a flame retarder, and a stabilizer, other than the above-mentioned unsaturated polyester, polymerizable monomer, and isocyanate component.

Examples of the curing agent include one or more kinds of acetylacetone peroxide, methyl ethyl ketone peroxide, diethyl ketone peroxide, methyl propyl ketone peroxide, methyl isobutyl ketone peroxide, methyl acetoacetate peroxide, ethyl acetoacetate peroxide, cyclohexanone peroxide, methylcyclohexanone peroxide, 3,3,5-trimethyl cyclohexanone peroxide, cumene peroxide, benzoyl peroxide, t-butylisopropylperoxy carbonate, 1,1-dibutylperoxy-3,3,5-trimethylcyclohexanone, t-butylperoxy-2-ethylhexanoate, amylperoxy-p-2-ethylhexanoate, 2-ethylhexylperoxy-2-ethylhexanoate, t-butylperoxy benzoate, and t-hexylperoxy benzoate.

A thickening catalyst may be appropriately blended with the above-mentioned unsaturated polyester resin composition, if needed. An organometallic compound may be mentioned as such a thickening catalyst, and an organotin compound and an organic titanium compound are especially preferred. Examples of the organotin compound and the organic titanium compound include dibutyltin dilaurate, dibutyltin dioctoate, dibutyltin diacetate, and tetraisopropyl titanate.

In content of the curing agent, a lower limit is 0.1 parts by weight and an upper limit is 5 parts by weight, relative to 100 parts by weight of the unsaturated polyester resin. If the content is less than 0.1 parts by weight, curing of the resin might be insufficient. If the content is more than 5 parts by weight, effects of the curing agent might be insufficient for the used amount. The lower limit is more preferably 0.3 parts by weight and still more preferably 0.5 parts by weight. The upper limit is more preferably 4 parts by weight, and still more preferably 3 parts by weight.

As the above-mentioned supplement accelerator, generally used supplement accelerator may be used. Examples of such supplement accelerators include one or more kinds of β-diketones such as acetylacetone, methyl acetoacetate, ethyl acetoacetate, α-acetyl-γ-butyrolactone, N-pyrrolidyl acetoacetoamide, N,N dimethyl acetoacetamide; β-ketoesters or β-ketoamides of amines such as dimethylaniline, N,N-dimethyl toluidine, N,N-diethylaniline, and N,N-di(hydroxy)-4-methylaniline. Use amount of the supplement accelerator is not especially limited. It is preferable that a lower limit of the use amount is 0.01 parts by weight and an upper limit of the use amount is 1 part by weight, relative to 100 parts by weight of the unsaturated polyester resin. More preferably, the lower limit is 0.03 parts by weight and the upper limit is 0.5 parts by weight.

The above-mentioned agent for providing air-dry property is an agent, which can improve drying property of the resin because the agent provides a deposition on a surface of a coating film or a molded product formed from the resin composition at the time of curing of the resin to form a barrier against air on the surface, whereby to prevent oxygen in air from inhibiting a radical polymerization of the resin. As such an agent for providing air-dry property, waxes and the like may be mentioned, for example, waxes described in the following (1) to (3). One or more kinds of the waxes may be used. And another component may be contained in the following waxes.

(1) Examples of natural waxes include plant waxes such as candelilla wax, carnauba wax, rice wax, Japan wax, and jojoba oil; animal waxes such as beeswax, lanolin, and whale wax; mineral waxes such as montan wax, ozokerite, and ceresin; and petroleum waxes such as paraffin wax, microcrystalline wax, and petrolatum.

(2) Examples of synthetic waxes include synthetic hydrocarbon such as Fischer-Tropsch wax and polyethylene wax; modified waxes such as montan wax derivative, paraffin wax derivative, and microcrystalline wax derivative; derivatives of animal fats and oils; copolymers of a carboxyl group-containing monomer and olefin; hydride waxes such as Hydrogenated castor oil, and Hydrogenated castor oil derivative; fatty acids containing 12 or more carbon atoms such as stearic acid, dodecanoic acid, and octadecyl stearate, and derivatives thereof; and alcohols, in which an alkylene oxide, such as ethylene oxide and propylene oxide is added to an alkyl phenyl or a higher alcohol.

(3) As others, blended waxes of the natural wax and the synthetic wax. Among them, paraffin wax is preferably used.

Use amount of the agent for providing air-dry property is not especially limited. It is preferable that a lower limit of the use amount is 0.001 parts by weight (10 ppm) and an upper limit of the use amount is 1 part by weight, relative to 100 parts by weight of the unsaturated polyester resin. More preferably, the lower limit is 0.01 parts by weight and the upper limit is 0.3 parts by weight.

As the above-mentioned filler, mentioned may be organic fillers such as aluminum hydroxide (ATH), calcium carbonate, calcium sulfate, barium sulfate, alumina, clay, talc, glass powder, milled fiber, cristobalite, mica, silica, river sand, kieselguhr, mica powder, plaster, and glass powder. Such fillers may be added within a range not deteriorating clearness of the coating film.

The above-mentioned polymerization inhibitor is used for adjusting usable time and rise of a curing reaction. Preferred examples of such a polymerization inhibitor include hydroquinones such as hydroquinone and methylhydroquinone; benzoquinones such as benzoquinone and methyl-p-benzoquinone; catechols such as t-butylcatechol; phenols such as 2,6-di-t-butyl-4-methylphenol, and 4-methoxyphenol; and phenothiazine, and copper naphthenate.

As the above-mentioned antifoaming agent, commercially available polymer antifoaming agents and other additives as well as silicone antifoaming agents.

As the above-mentioned internal release agent, mentioned may be a silicone internal release agent having a dimethylsiloxane structure, such as dimethylpolysiloxane. Such an internal release agent may be added within a range not deteriorating clearness of the coating film.

Preferred examples of the above-mentioned thickener other than the above-mentioned isocyanate component include polyvalent metal oxides such as magnesium oxide, calcium oxide, and zinc oxide; polyvalent metal hydroxides such as magnesium hydroxide, and calcium hydroxide. Such a thickener may be added within a range not deteriorating clearness of the coating film.

Preferred examples of the above-mentioned thickening aid include water, alcohol, and pulverized silica.

As the above-mentioned inorganic aggregate, preferably used are inorganic powders such as silica sand, silica, clay, bentonite, aluminum hydroxide, alumina, talc, and calcium carbonate. Preferred examples of the inert powders include powders and/or ground products of: a thermosetting resin, such as polyethylene, polypropylene, and polystyrene; a cured product of a thermosetting resin such as acrylate resin, polyester resin, phenol resin, and urethane resin; a rubber; or a wood.

The above-mentioned shrinkage-reducing agent may be used for adjusting mold shrinkage. Examples of such a shrinkage-reducing agent include polystyrene, polyethylene, polyvinyl acetate, crosslinked polystyrene, polyvinyl acetate-polystyrene block copolymer, an acrylic or styrene polymer with a multiphase structure, a crosslinked or non-crosslinked polymer with a multiphase structure, and SBS (rubber). Such a shrinkage-reducing agent may be added within a range not deteriorating clearness of the coating film.

As the above-mentioned coloring agent, mentioned may be publicly known pigments, such as titanium oxide, carbon black, iron oxide red, and copper phthalocyanine blue. Such a coloring agent may be added within a range not deteriorating clearness of the coating film.

Examples of the above-mentioned designing agent include aluminum oxide, PET film, mica, ceramic, and those coated with a coloring agent, finishing agent and the like; those plated; and ground products prepared by pulverizing a heat-cured product of a thermosetting resin, an inorganic filler, an a coloring agent and the like.

Thickness of the above-mentioned layer formed by the unsaturated polyester resin composition is not especially limited, and may be appropriately determined depending on applications, thickness of the decorative veneer, and the like. However, the thickness is preferably 200 to 1500 μm, and more preferably 300 to 1200 μm in order to produce a composite having gloss and depth of wood graining, high strength, and durability.

The wood coated composite according to the present invention can be produced, as mentioned above, by placing an unsaturated polyester resin composition on a decorative veneer and heat-pressing the decorative veneer and the composition placed thereon to mold the composite. However, the wood coated composite may be produced, for example, by production methods of the present invention mentioned below. Such a form is part of preferable embodiment of the present invention.

According to the production methods of the present invention, the unsaturated polyester resin composition is first adjusted. As the adjustment, it may be performed that an addition and a mix of a curing agent and various additives and the like to be added if necessary, as well as the above-mentioned unsaturated polyester resin and isocyanate component. The way of mixing is not especially limited. However, such raw materials are added and mixed, and then the unsaturated polyester resin component is preferably kept standing under a temperature of 20 to 50° C. for 5 to 100 hours before the heat-pressing. If the temperature is less than 20° C., thickening of the unsaturated polyester resin composition might be insufficient. If the temperature is more than 50° C., the unsaturated polyester resin composition might be cured because decomposition of the curing agent is accelerated. More preferably, the temperature is 30 to 40° C. and the time for keeping the composition standing is 20 to 80 hours.

In the above-mentioned production methods, then the unsaturated polyester resin composition is placed on a decorative veneer. The way of the placement is not especially limited. For example, mentioned may be a method of placing the unsaturated polyester resin composition, which is gel-like and thickened, on a decorative veneer (or a base material and a decorative veneer) and then placing the decorative veneer and the unsaturated polyester resin composition placed thereon, on a mold used in the heat-pressing step. The heat-pressing step performed after placing the unsaturated polyester resin composition means molding by a compression molding method or an injection molding method as mentioned above. If the injection molding method is adopted, it is preferable that the decorated veneer is placed on a mold for injection molding, and then the above-mentioned unsaturated polyester resin composition is injected under pressurization.

Use amount of the above mentioned polyester resin composition is not especially limited and may be appropriately determined depending on thickness of the layer formed by the resin composition or handling property.

As the mold, generally-used mold may be used, and size thereof and the like may be appropriately selected depending on applications and the like of the composite.

In the production methods of the present invention, then the heat-pressing step is performed. The pressure inside the mold may be reduced once before a stacked body inside the mold is subjected to the heat-pressing. In this case, deaeration of remaining bubbles in the coating film, the decorative veneer and the like can be sufficiently performed, whereby to produce a coated wood composite, in which generation of white turbidity and bubbles are suppressed enough.

Temperature of the mold in the heat-pressing step may be appropriately determined depending on maximum stable temperature of a substrate to be used or kind of a resin. For example, the temperature is 80 to 160° C. If the temperature is more than 160° C., the resin composition might go into a liquid state during the pressing, and therefore bubbles remain on the coating film surface. And the decorative veneer and the coating film might get colored. If the temperature is less than 80° C., it takes a long time to cure the resin composition, which might be problem in terms of production cycle, and physical properties of the coating film might be reduced because the resin is not sufficiently cured. The temperature is more preferably 90 to 140° C., and still more preferably 100 to 130° C.

On the other hand, if the above-mentioned resin composition thickened by the diisocyanate is heated, viscosity of the composition lowers, and further, the composition will become liquefied at much higher temperature, as mentioned above. Accordingly, it is preferable that the time for pressing is set to be longer without raising the mold temperature in the above-mentioned heat-pressing step. Thereby, possibility for bubbles to remain on the cured coating film surface due to entrainment of bubbles at the time of the pressing can be sufficiently reduced, which permits securing of sufficient thickness of the coating film. In order to make such procedures more preferable in terms of production cycle of industrial products, it is preferable that a preliminary pressing step is performed at a low temperature and then the heat-pressing step, in which the temperature is raised while maintaining the pressure, is performed. Such procedures can more sufficiently suppress generation of the bubbles, and can mold the coated wood composite having a sufficient thickness of the coated film for a shorter time, whereby to further improve productivity of the coated wood composite.

The mold temperature at the time of the preliminary pressing is preferably less than 80° C., and more preferably 70° C., and still more preferably less than 60° C. On the other hand, the mold temperature is preferably 40° C. or more. As mentioned above, the mold temperature at the heat-pressing is preferably 80 to 160° C., and more preferably 90 to 140° C., and still more preferably 100 to 130° C. The mold temperature at the time of the heat-pressing is higher than that at the time of the preliminary pressing, preferably by 20° C. or more, and more preferably by 30° C. or more.

In the above-mentioned heat-pressing step, the time for the heating is not especially limited, and, for example, it is preferably 10 minutes or less. It is more preferably 5 minutes or less in terms of production cycle of industrial products. It is also preferably 30 minutes or more, and more preferably 1 minute or more.

Pressurizing pressure in the above-mentioned preliminary pressing and heat-pressing steps is preferably 5 to 100 kg/cm$^2$. If the pressurizing pressure is more than 100 kg/cm$^2$, cracks, deformation and the like might be caused, and the thickness of the coating film might not be secured enough because of leakage of the resin composition from the gap of the mold. If the pressurizing pressure is less than 5 kg/cm$^2$, the resin composition might be unevenly spread over the decorative veneer, and bubbles might be generated on the coating film surface. An upper limit of the pressurizing pressure is more preferably 80 kg/cm$^2$, and still more preferably 60 kg/cm$^2$. A lower limit of the pressurizing pressure is more preferably 10 kg/cm$^2$. If the pressurizing pressure is set to 5 to 100 kg/cm$^2$ as mentioned above, a simple polishing step is enough to make the coating surface flat and uniform, leading to improvement in productivity of the coated wood composite. This is because the resin composition thickened by the diisocyanate contains a linear structure molecule. Therefore, the resin composition goes in a liquid state and spreads well into wood graining or holes of vessels of the decorative veneer that is a natural product to relax stress generated at the time of the pressing.

In the production methods, it is preferable that the mold temperature is lowered while maintaining the pressure after the heat-pressing step, and then preferably a stacking body is removed from the mold. Such procedures can make the coating surface flat and uniform without performing a polishing work many times for long hours, leading to further improvement of productivity of the coated wood composite. This is because heat shrinkage, which may be caused at a cured part at the time of the heat-pressing step, can be sufficiently suppressed by maintaining the pressure during the cooling of the coating film. That is, the decorative veneer used in the present invention has wood graining and holes of vessels because it is a natural product. Therefore, the coating film may have an orange peel-like surface because of the heat shrinkage of the coating film after the heating pressing. However, such phenomenon can be sufficiently eliminated through the above-mentioned steps in which the coating film is cooled while maintaining the pressure and then removed from the mold. Therefore, better surface appearance can be obtained. Such steps can not only shorten the spray coating and curing steps essentially performed in conventional spray coating methods, but also shorten the steps until the polishing step, which allows for sufficient reduction in the raw materials loss.

In the cooling step, it is preferable that the mold temperature at the above-mentioned heat-pressing is lowered by 30° C. or more than the temperature at the time of the above-mentioned heat-pressing. Such a procedure can sufficiently reduce a possibility of the shrinkage of the resin coating film after removal from the mold, whereby to exhibit higher appearance. The mold temperature at the time of the heat-pressing is more preferably lowered by 40° C. or more, and still more preferably by 50° C. than the temperature at the above-mentioned heat-pressing.

In the cooling step, a method of the cooling is not especially limited. For example, the coating film may be cooled by being kept standing as it is or flowing water while maintaining the pressure. The time for the cooling may be appropriately determined depending on a difference in temperature before and after the cooling.

In the above-mentioned production methods, a surface polishing work may be applied for the coated wood composite after removal from the mold. The present invention can provide a coated wood composite excellent in surface properties such as clearness, flatness, gloss, uniformity, and depth, without an additional surface polishing work. However, the coated wood composite can exhibit more excellent surface properties if it is polished.

The coated wood composite of the present invention has surface properties such as clearness, flatness, gloss, uniformity, and depth, and exhibits high appearance, because of the above-mentioned configuration. The coated wood composite can be preferably applied to interior parts of cars and the like in particular. The production methods of a coated wood composite of the present invention allow for an efficient and simple production of such a coated wood composite with high quality and high appearance, and also allows for good work environment.

BEST MODE FOR CARRYING OUT THE INVENTION

The present invention will, hereinafter, be described in more detail with reference to Examples, but the present invention is not limited to the Examples. The terms, "part(s)" and "%" represent "part(s) by weight" and "% by weight", respectively, unless otherwise specified.

In the following Production Examples, weight average molecular weight was measured according to the GPC measurement conditions mentioned above. Acid value was measured according to JIS K 0070-1992, and hydroxyl value was measured according to JIS K 6901-1999.

Production Example A

Unsaturated Polyester Resin A

A reactor equipped with a thermometer, a stirrer, a gas inlet tube, and a condenser was charged with fumaric acid 1160 g, neopentyl glycol 1040 g, bisphenol A 2EO adducts 2844 g to prepare a reaction solution. The reaction solution was heated to 200° C. under nitrogen gas flow and an esterification reaction was allowed to proceed for 9 hours until an acid value measured by a predetermined method became 0.5 mg KOH/g or less, while removing generated condensed water from the system. Then, the reaction solution inside the reactor was cooled to 50° C. to complete the reaction, whereby an unsaturated polyester with a hydroxyl value of 163 mg KOH/g was produced as a reaction product. Then, to the unsaturated polyester were added hydroquinone 0.5 g as a polymerization inhibitor and styrene 1561 g as a radical polymerizable monomer, and then the mixture was blended to give an unsaturated polyester resin A with a hydroxyl value of 163 mg KOH/g.

Production Example B

Unsaturated Polyester Resin B

A reactor equipped with a thermometer, a stirrer, a gas inlet tube, and a condenser was charged with fumaric acid 1160 g, neopentyl glycol 624 g, bisphenol A 2EO adducts 2844 g to prepare a reaction solution. The reaction solution was heated to 200° C. under nitrogen gas flow and an esterification reaction was allowed to proceed for 15 hours until an acid value measured by a predetermined method became 0.5 mg KOH/g or less, while removing generated condensed water from the system. Then, the reaction solution inside the reactor was cooled to 50° C. to complete the reaction, whereby an unsaturated polyester with a hydroxyl value of 100 mg KOH/g as produced as a reaction product. Then, to the unsaturated polyester were added hydroquinone 0.4 g as a polymerization inhibitor and styrene 1388 g as a radical polymerizable monomer, and then the mixture was blended to give an unsaturated polyester resin B with a hydroxyl value of 100 mg KOH/g.

Production Example C

Unsaturated Polyester Resin C

A reactor equipped with a thermometer, a stirrer, a gas inlet tube, and a condenser was charged with fumaric acid 1160 g, neopentyl glycol 624 g, bisphenol A 2EO adducts 1896 g to prepare a reaction solution. The reaction solution was heated to 200° C. under nitrogen gas flow and an esterification reaction was allowed to proceed for 20 hours until an acid value measured by a predetermined method became 0.5 mg KOH/g or less, while removing generated condensed water from the system. Then, the reaction solution inside the reactor was cooled to 50° C. to complete the reaction, whereby an unsaturated polyester with a hydroxyl value of 52 mg KOH/g was produced as a reaction product. Then, to the unsaturated polyester were added hydroquinone 0.3 g as a polymerization inhibitor and styrene 1107 g as a radical polymerizable monomer, and then the mixture was blended to produce an unsaturated polyester resin C with a hydroxyl value of 52 mg KOH/g.

Production Example D

Unsaturated Polyester Resin D

A reactor equipped with a thermometer, a stirrer, a gas inlet tube, and a condenser was charged with fumaric acid 1160 g, neopentyl glycol 1144 g, bisphenol A 2EO adducts 3476 g to prepare a reaction solution. The reaction solution was heated to 200° C. under nitrogen gas flow and an esterification reaction was allowed to proceed for 7 hours until an acid value measured by a predetermined method became 0.5 mg KOH/g or less, while removing generated condensation water from the system. Then, the reaction solution inside the reactor was cooled to 50° C. to complete the reaction, whereby an unsaturated polyester with a hydroxyl value of 188 mg KOH/g was produced as a reaction product. Then, to the unsaturated polyester were added hydroquinone 0.5 g as a polymerization inhibitor and styrene 1772 g as a radical polymerizable monomer, and then the mixture was blended to produce an unsaturated polyester resin D with a hydroxyl value of 188 mg KOH/g.

Production Example E

Unsaturated Polyester Resin E

A reactor equipped with a thermometer, a stirrer, a gas inlet tube, and a condenser was charged with fumaric acid 464 g, isophthalic acid 996 g, neopentyl glycol 1040 g, bisphenol A 2EO adducts 2844 g to prepare a reaction solution. The reaction solution was heated to 200° C. under nitrogen gas flow and an esterification reaction was allowed to proceed for 20 hours until an acid value measured by a predetermined method became 0.5 mg KOH/g or less, while removing condensation water from the system. Then, the reaction solution inside the reactor was cooled to 50° C., and then the reaction was completed to produce an unsaturated polyester with a hydroxyl value of 155 mg KOH/g as a reaction product. Then, to the unsaturated polyester were added hydroquinone 0.5 g as a polymerization inhibitor and styrene 1661 g as a radical polymerizable monomer, and then the mixture was blended to produce an unsaturated polyester resin E with a hydroxyl value of 155 mg KOH/g.

Example 1

To the unsaturated polyester resin A 100 parts produced in Production Example A was added a curing agent 1 part (trade name "PERHEXA TMH", product of NOF Corp.), IPDI (isophorone diisocyanate) as a thickener, and dibutyl tin dilaurate 0.001 parts as a catalyst, and the mixture was blended. And the blended mixture was thickened by being kept standing for 24 hours in an air oven at 40° C. to produce a thickened resin. Table 1 shows an added amount of IPDI and a ratio of an isocyanate group equivalent in the IPDI (a ratio of an isocyanate group equivalent:isocyanate group equivalents per hydroxyl group equivalent in the unsaturated polyester).

A board of plywood with a decorative veneer (184 mm in diameter) was placed on a round tray-shaped mold with a diameter of 188 mm, and thereon charged was the above-mentioned thickened resin 130 g and pressed by heat-pressing under a mold temperature of 100° C. and a pressing pressure of 20 kg/cm² for 20 minutes. Then, a molded product was removed from the mold. The thus-produced coated wood composite was measured for thickness of the coating film. The coated wood composite was also measured for residual bubbles in the coating film and appearance of the coating film according to the following evaluation methods. Table 1 shows results.

(Residual Bubbles in the Coating Film)
Ten of the above-mentioned coated wood composites were molded and these composites were evaluated how many composites had remaining bubbles in the coated film.

(Appearance of the Coating Film)
It was determined by eye observation whether or not the coating film was uniform and transparent, and had a flat surface. The coating film was evaluated according to the following standards.
Good: a state in which a simple polishing allows for a uniform and mirror surface.
Excellent: Mirror surface and no orange peer. No need for polishing.

Example 2 and Comparative Examples 1 to 5

Wood coated composites were produced in the same manner as in Example 1, except that the added amount of the unsaturated polyester resin and IPDI was changed to amounts respectively shown in Table 1. The produced coated wood composites were evaluated for coated film thickness, residual bubbles in the coated films and appearance of the coated films in the same manner as in Example 1. Table 1 shows results.

TABLE 1

|  |  | Example 1 | Example 2 | Comparative Example 1 | Comparative Example 2 | Comparative Example 3 | Comparative Example 4 | Comparative Example 5 |
|---|---|---|---|---|---|---|---|---|
|  | Resin | A | B | C | D | E | A | A |
|  | Unsaturated dibasic acid component (% by mole) | 100 | 100 | 100 | 100 | 40 | 100 | 100 |
|  | Acid/glycol ratio | 1.0/1.9 | 1.0/1.5 | 1.0/1.2 | 1.0/2.2 | 1.0/1.9 | 1.0/1.9 | 1.0/1.9 |
|  | Added amount of IPDI (part) | 21.8 | 14.3 | 7.0 | 25.3 | 20.8 | 14.6 | 31.5 |
|  | Ratio of an isocyanate group equivalent | 0.9 | 0.95 | 0.9 | 0.9 | 0.9 | 0.6 | 1.3 |
| Heat-pressing | Mold temperature (Ž) | 100 | 100 | 100 | 100 | 100 | 100 | 100 |
|  | Pressing time (minute) | 20 | 20 | 20 | 20 | 20 | 20 | 20 |
|  | Pressing pressure (kg/cm²) | 30 | 30 | 30 | 30 | 30 | 30 | 30 |
|  | Coating film thickness (ƒÊ) | 600 | 300 | 20 | 1100 | 30 | 20 | 900 |
|  | Residual bubbles in coating film | 3/10 | 5/10 | 10/10 | 3/10 | 4/10 | 10/10 | 0/10 |
|  | Appearance of coating layer | Good | Good | Uneven | Nonuniformity surface | Crack and | Uneven peeling | Nonuniformity surface |

In the above Table 1, the term "unsaturated dibasic acid component (% by mole)" means an amount of unsaturated dibasic acid components relative to 100% by mole of a total of acid components.

Example 3

A thickened resin was produced in the same manner as in Example 1. And a board of plywood with a decorative veneer (184 mm in diameter) was placed on a round tray-shaped mold with a diameter of 188 mm, and thereon charged was the thickened resin 130 g and pressed by heat-pressing for 3 minutes under a mold temperature of 130° C. and a pressing pressure of 30 kg/cm². Then, a molded product was removed from the mold. Table 2 shows the mold temperature and the pressing pressure (the pressing pressure was fixed) at the heat pressing and a mold temperature at the time of the removal from the mold.

The produced coated wood composite was evaluated for coating film thickness, residual bubbles in the coating film and appearance of the coating film in the same manner as in Example 1. Table 2 shows results.

Example 4

A thickened resin was produced in the same manner as in Example 1. And a board of plywood with a decorative veneer (184 mm in diameter) was placed on a round tray-shaped mold with a diameter of 188 mm, and thereon charged was the thickened resin 130 g and pressed by heat-pressing for 3 minutes under a mold temperature of 130° C. and a pressing pressure of 30 kg/cm². Then, a molded product was cooled at 20° C. per minute while maintaining the pressing pressure and removed from the mold. Table 2 shows the mold temperature and the pressing pressure (the pressing pressure was fixed) at the heat-pressing and a mold temperature at the time of the removal from the mold.

The produced coated wood composite was evaluated for coating film thickness, residual bubbles in the coating film and appearance of the coating film in the same manner as in Example 1. Table 2 shows results.

Example 5

A thickened resin was produced in the same manner as in Example 1. And a board of plywood with a decorative veneer (184 mm in diameter) was placed on a round tray-shaped mold with a diameter of 188 mm, and thereon charged was the thickened resin 130 g. Then, pressurization was started and a mold temperature was maintained at a temperature of preliminary pressing for 1 minute, and then the mold temperature was heated to a temperature of heat-pressing at a rate of about 20° C. per minute. After the mold temperature reached to the temperature of heat-pressing, the state was maintained for 3 minutes to remove a molded product from the mold. Table 2 shows the mold temperatures at the preliminary pressing and the heat-pressing, the pressing pressure (the pressing pressure was fixed during the preliminary pressing and the heat-pressing), and a mold temperature at the time of the removal from the mold.

The produced coated wood composite was evaluated for coating film thickness, residual bubbles of the coating film, and appearance of the coating film in the same manner as in Example 1. Table 2 shows results.

Example 6

A thickened resin was produced in the same manner as in Example 1. And a board of plywood with a decorative veneer (184 mm in diameter) was placed on a round tray-shaped mold with a diameter of 188 mm, and thereon charged was the thickened resin 130 g. Then, pressurization was started and a mold temperature was maintained at a temperature of preliminary pressing for 1 minute, and then the mold temperature was heated to a temperature of heat-pressing at a rate of about 20° C. per minute. After the mold temperature reached to the temperature of heat-pressing, the state was maintained for 3 minutes. Then, the pressing pressure was maintained and a molded product was cooled at a rate of 20° C. per minute and removed from the mold. Table 2 shows the mold temperatures at the preliminary pressing and the heat-pressing, the pressing pressure (the pressing pressure was fixed during the preliminary pressing and the heat-pressing), and a mold temperature at the time of the removal from the mold.

The produced coated wood composite was evaluated for coating film thickness, residual bubbles in the coating film, and appearance of the coating film in the same manner as in Example 1. Table 2 shows results.

Example 7

A thickened resin was produced in the same manner as in Example 1. And a board of plywood with a decorative veneer (184 mm in diameter) was placed on a round tray-shaped mold with a diameter of 188 mm, and thereon charged was the thickened resin 130 g. Then, pressurization was started and a mold temperature was maintained at a temperature of preliminary pressing for 1 minute, and then the mold temperature was heated to a temperature of heat-pressing at a rate of about 20° C. per minute. After the mold temperature reached to the temperature of heat-pressing, the state was maintained for 20 minutes. Then, the pressing pressure was maintained and a molded product was cooled at a rate of 20° C. per minute and removed from the mold. Table 2 shows the mold temperatures at the preliminary pressing and the heat-pressing, the pressing pressure (the pressing pressure was fixed during preliminary pressing and heat-pressing), and a mold temperature at the time of the removal from the mold.

The produced coated wood composite was evaluated for coating film thickness, residual bubbles in the coating film, and appearance of the coating film in the same manner as in Example 1. Table 2 shows results.

TABLE 2

|  | Example 3 | Example 4 | Example 5 | Example 6 | Example 7 |
|---|---|---|---|---|---|
| Resin | A | A | A | A | A |
| Form of production method in the present invention | I | (1) | (2) | (3) | (3) |
| Unsaturated dibasic acid component (% by mole) | 100 | 100 | 100 | 100 | 100 |
| Acid/glycol ratio | 1.0/1.9 | 1.0/1.9 | 1.0/1.9 | 1.0/1.9 | 1.0/1.9 |
| Added amount of IPDI (part) | 21.8 | 21.8 | 21.8 | 21.8 | 14.6 |
| Ratio of an isocyanate group equivalent | 0.9 | 0.9 | 0.9 | 0.9 | 0.6 |
| Mold temperature at preliminary pressing (Ž) | No performed | No performed | 50 | 50 | 50 |
| Mold temperature at heat-pressing (Ž) | 130 | 130 | 130 | 130 | 100 |
| Heat-pressing time (minute) | 3 | 3 | 3 | 3 | 20 |
| Pressing pressure (kg/cm²) | 30 | 30 | 30 | 30 | 20 |
| Mold temperature at removal from mold (Ž) | 130 | 60 | 130 | 60 | 60 |
| Coating film thickness (ƒÊ) | 300 | 300 | 900 | 900 | 200 |
| Residual bubbles in coating film | 5/10 | 5/10 | 0/10 | 0/10 | 4/10 |
| Appearance of coating layer | Good | Excellent | Good | Excellent | Good |

In the above Table 2, the term "unsaturated dibasic acid component (% by mole)" has the same meaning as in Table 1, and the term "heat-pressing time" means a time for maintaining a mold temperature after reaching to a temperature of heat-pressing. Also, (1) to (3) shown in "form of production method of the present invention" corresponds to the above-mentioned production methods (1) to (3), respectively. and shows which method each Example described in Table 2 employs.

Examples 8 and 9

Each of the coated wood composites produced in Examples 7 and 6 (Example 8: the molded product produced in Example 7 was used; and Example 9: the molded product produced in Example 6 was used) was evaluated for impact resistance according to the following test method. Table 3 shows results.
(Impact Resistance Test)
Measurement was performed according to DuPont test method described in JIS K 5600-5-3:1999. Weight and height were determined as follows.
Weight: 500 g
Height: 30 cm Comparative Example 6

The unsaturated polyester resin A produced in Production Example A 100 parts was mixed with fine silica 2.5 parts (trade name "Aerosil #200", product of Nippon Aerosil Co., Ltd.), styrene 20 parts, and 140 F normal paraffin 0.1 parts with a homomixer to prepare a coating material for spraying. With the coating material was mixed cobalt octenate 0.5% and Kayamek M 1.0% (trade name, product of Kayaku Akzo Corp.). Then, the mixture was applied to a board of plywood with a decorative veneer such that the coating film thickness was 1000μ with a cup gun. Then, the plywood was kept standing for 5 hours, and provided with after-curing at 60° C. for 4 hours. Then, the plywood was polished with #400 and #800 sandpapers, and then polished with a compound to produce a coated wood composite.

The produced coated wood composite was evaluated for impact resistance according to the above-mentioned test method. Table 3 shows results.

TABLE 3

| Molded product | Comparative Example 6 (Spray coated product) | Example 8 (Molded product in Example 7) | Example 9 (Molded product in Example 6) |
|---|---|---|---|
| Impact resistance test | Crack | Dent | No change |

The present application claims priority under 35 U.S.C. §119 to Japanese Patent Application No. 2005-225144 filed Aug. 3, 2005, entitled "COATED WOOD COMPOSITE AND PRODUCTION METHOD THEREOF." The contents of that application are incorporated herein by reference in their entirely.

The invention claimed is:

1. A method comprising:
    placing a composite including a decorative wood veneer having an unsaturated polyester resin composition on at least one of its outer surfaces in a mold such that the resin composition is exposed, the unsaturated polyester resin composition having a thickness from 200 to 1500 μm and comprising an unsaturated polyester, a polymerizable monomer, and an isocyanate component including an aliphatic diisocyanate;
    deaerating bubbles in the unsaturated polyester resin composition;
    after the unsaturated polyester resin composition has been deaerated, curing the unsaturated polyester resin composition in the mold at a temperature of 80 to 160° C. and a pressure of 5 to 100 kg/cm$^2$;
    lowering the temperature of the mold by 30° C. or more while maintaining the pressure in the mold; and thereafter
    removing the composite from the mold with the unsaturated polyester resin composition being exposed.

2. The method of claim 1, further comprising the steps of, prior to placing the composite in the mold;
    maintaining the unsaturated polyester resin composition under a temperature of 20 to 50° C. for 5 to 100 hours; and thereafter
    placing the unsaturated polyester resin composition on the decorative veneer.

3. The method of claim 1, further comprising, before the step of curing the unsaturated polyester resin composition, pressing the unsaturated polyester resin composition onto the decorative veneer while it is in the mold at a temperature of between 40° C. and 80° C.

4. The method of claim 1, wherein the deaerating step comprises reducing the pressure in the mold.

5. The method of claim 1 further comprising the step of placing the unsaturated polyester resin composition on at least one of the surfaces of the veneer prior to the step of placing the composite in the mold.

* * * * *